United States Patent
Hann et al.

(10) Patent No.: US 6,853,643 B1
(45) Date of Patent: Feb. 8, 2005

(54) INTERLEAVED READ/WRITE OPERATION IN A DATA SWITCH

(75) Inventors: William P. Hann, Round Rock, TX (US); Guillermo A. Franco, Austin, TX (US); Craig D. Botkin, Cedar Park, TX (US); James W. Edwards, III, Austin, TX (US)

(73) Assignee: Cisco Technology, Inc., San Jose, CA (US)

( * ) Notice: Subject to any disclaimer, the term of this patent is extended or adjusted under 35 U.S.C. 154(b) by 942 days.

(21) Appl. No.: 09/745,452

(22) Filed: Dec. 21, 2000

(51) Int. Cl.[7] ............................................. H04L 12/54
(52) U.S. Cl. ..................................... 370/413; 711/157
(58) Field of Search ................................. 370/351, 389, 370/395.1, 395.4, 412, 413–419; 711/100, 117, 118, 127, 129, 147, 150, 157

(56) References Cited

U.S. PATENT DOCUMENTS

| 5,802,055 | A | * | 9/1998 | Krein et al. ................. 370/413 |
| 5,813,040 | A | * | 9/1998 | Rathke ........................ 711/157 |
| 6,128,306 | A | * | 10/2000 | Simpson et al. ............. 370/413 |
| 6,275,504 | B1 | * | 8/2001 | Kim et al. ................... 370/471 |
| 6,728,254 | B1 | * | 4/2004 | Stacey et al. ................ 370/413 |

* cited by examiner

Primary Examiner—Hassan Kizou
Assistant Examiner—David Odland
(74) Attorney, Agent, or Firm—Baker Botts L.L.P.

(57) ABSTRACT

An interleaved read/write operation in a data switch determines a read memory of at least two memories that has been accessed during a most recent read operation. A memory controller determines a write memory different from the read memory and accesses a cell buffer list associated with the write memory to determine a buffer to store the cell. The switch writes the cell to the buffer to interleave read/write operations between the read memory and the write memory.

31 Claims, 3 Drawing Sheets

INTERLEAVED READ/WRITE OPERATION IN A DATA SWITCH

TECHNICAL FIELD OF THE INVENTION

This invention relates in general to data communication, and more particularly to an interleaved read/write operation in a data switch.

BACKGROUND OF THE INVENTION

A data switch, such as an asynchronous transfer mode (ATM) switch, communicates packets of information or cells between various components in a communication device. For example, a data switch may reside in a digital subscriber line access multiplexer (DSLAM) to communicate cells between any number of subscriber interfaces and network interfaces. Typically, these switches use a cell buffer memory to store cells received from an originating location before communicating the cells to their destination.

Currently, memory technologies exist that may be suitable for use in a cell buffer memory of a data switch. For example a static random access memory (SRAM) provides high speed read/write access, but is relatively expensive. Dynamic random access memory (DRAM) is a widely available and cost efficient solution, but suffers performance disadvantages that may impact the overall throughput of a switch.

SUMMARY OF THE INVENTION

In accordance with the present invention, the disadvantages and problems associated with data switches have been substantially reduced or eliminated. In particular, an interleaved read/write operation is disclosed that improves the performance of a data switch.

In accordance with one embodiment of the present invention, an apparatus for cell storage in a data switch includes at least two memories that store cells. At least two cell buffer lists associated with the memories specify locations in the memories available for cell storage. A memory controller coupled to the memories and the cell buffer lists receives a write request to store a cell and determines a read memory of the memories that has been accessed during a most recent read operation. The memory controller determines a write memory different from the read memory and accesses a cell buffer list associated with the write memory to determine a buffer to store the cell. The apparatus writes the cell to the buffer to interleave read/write operations between the read memory and the write memory.

In accordance with another embodiment of the present invention, a method to interleave read/write operations in a data switch is disclosed. The switch includes at least two memories that store cells and at least two cell buffer lists specifying locations in the memories available for cell storage. The method includes receiving a write request to store a cell and determining a read memory of the memories that have been accessed during a most recent read operation. The method determines a write memory different from the read memory and accesses a cell buffer list associated with the write memory to determine a buffer to store the cell. The method then writes the cell to the buffer to interleave read/write operations between the read memory and the write memory.

Important technical advantages of certain embodiments of the present invention include interleaved read/write access in a data switch using at least two memories to improve switch performance. In a particular embodiment, a memory controller processes both read requests and write requests. Upon receiving a write request, the memory controller selects a memory different from the memory accessed during the most recent read request. By writing a cell to this selected memory, the memory controller interleaves read/write operations in the switch to improve the overall performance of the switch.

Other important technical advantages of certain embodiments of the present invention include a variety of memory technologies and architectures that support interleaved read/write operations. In a particular embodiment, the cell buffer memory of the switch may include two banks of a dynamic random access memory (DRAM) accessible using a common set of signal lines. In another embodiment, the cell buffer memory may include at least two separately accessible blocks of DRAM, each block accessible by a separate set of signal lines. The memory may be pre-charged after a write operation to enable row selection for subsequent access. Other technical advantages will be apparent to one skilled in the art from the following figures, descriptions, and claims.

BRIEF DESCRIPTION OF THE DRAWINGS

For a more complete understanding of the present invention and its advantages, reference is now made to the following description, taken in conjunction with the accompanying drawings, in which.

DETAILED DESCRIPTION OF THE INVENTION

Figure 1:
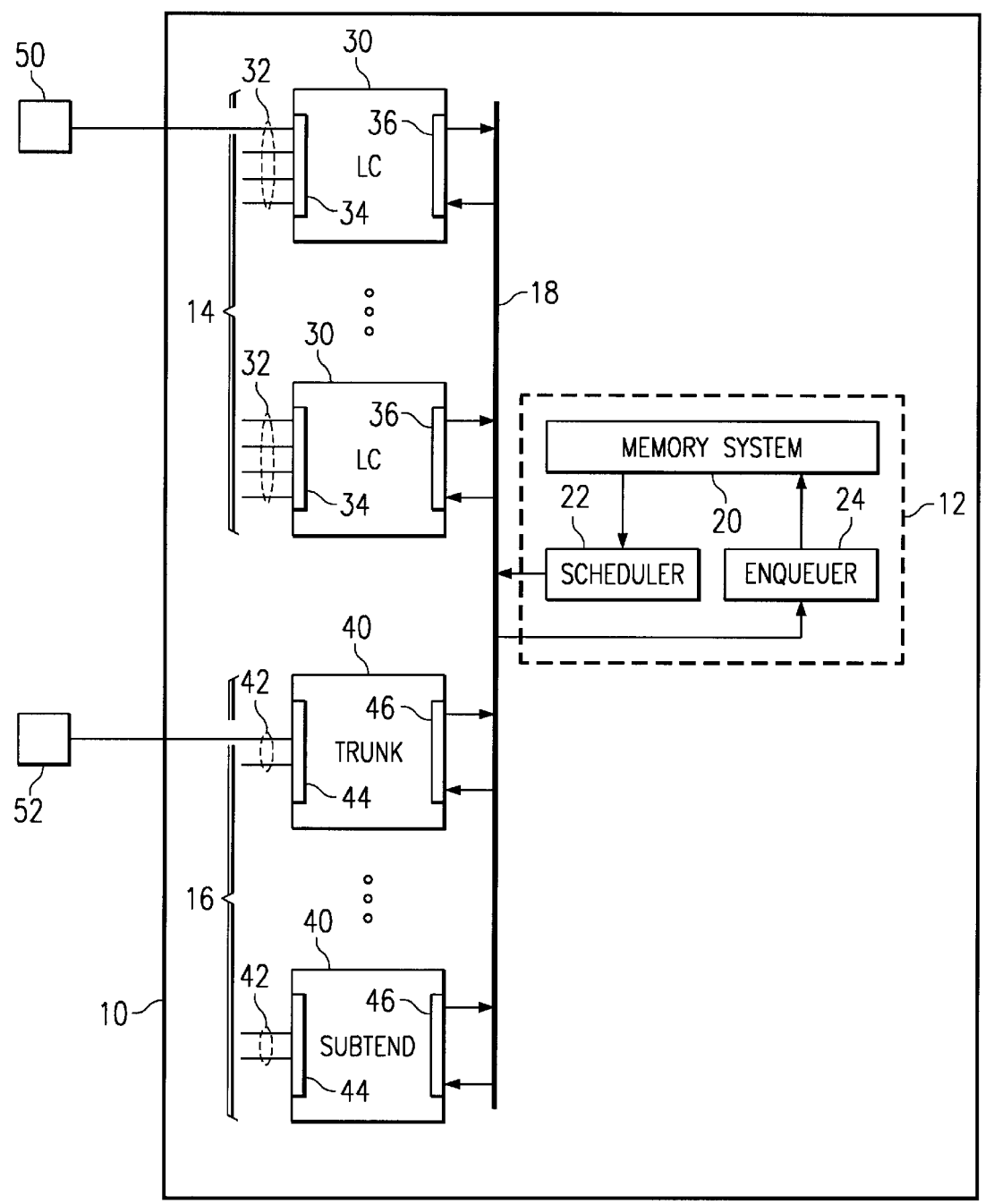
FIG. 1 illustrates a communication device incorporating a data switch according to the teachings of the present invention.

FIG. 1 illustrates a communication device 10 that includes a data switch 12 coupled to a number of subscriber interfaces 14 and network interfaces 16 using bus 18. Switch 12 communicates cells, packets, frames, or other portions of information (generally referred to as cells) between interfaces 14 and 16 using interleaved read/write operations. Although one described embodiment of communication device 10 is an asynchronous transfer mode (ATM) switch in a digital subscriber line access multiplexer (DSLAM), communication device 10 may be any appropriate access device, transport device, hub, switch, router, or other communication device that includes the functionality and operation of data switch 12.

Switch 12 includes a memory system 20, a scheduler 22, and an enqueuer 24. Switch 12 receives cells from interfaces 14, 16 and enqueuer 24, and stores the cells temporarily in memory system 20. Scheduler 22 retrieves stored cells for communication to interfaces 14, 16 using a suitable addressing scheme based on port, virtual path, virtual channel, or other physical and/or virtual identifiers. Switch 12 communicates cells between any interfaces 14, 16, ports or subports on interfaces 14, 16, or other physical ports, virtual ports or locations in communication device 10.

Switch 12 may also perform quality of service (QoS), flow control, channelization, or other technique to establish virtual paths or channels in communication device 10 having any appropriate bandwidth, quality, frame structure, data content, or other appropriate characteristics. Switch 12 may also perform suitable framing, segmentation, re-assembly, or other operations to translate cells into other suitable protocols for communication with interfaces 14, 16. FIG. 1 illustrates switch 12 functionally as including memory system 20, scheduler 22, and enqueuer 24. However, switch 12 may include any number of hardware and/or software components to accomplish its overall functions and operations. For example, switch 12 may include any variety of field programmable gate arrays (FPGAs), buffers, look-up tables, queues, controllers, processors, or other logic encoded in media, components and/or modules to accomplish the overall function of switching cells in communication device 10.

Subscriber interfaces 14 may include a number of line cards 30 that communicate information between subscriber lines 32 and bus 18. Each line card 30 includes a line interface 34, a bus interface 36, and any number and/or arrangement of modems, transceivers, and/or processing and communication devices that communicate information between line interface 34 and bus interface 36. In a particular embodiment, each line card 30 includes a number of digital subscriber line (DSL) modems that can establish ATM over DSL sessions using twisted pair lines coupled to subscriber. Line cards 30 receive information from subscribers coupled to line 32 using line interface 34. Line cards 30 aggregate and communicate this information to switch 12 as cells using bus interface 36 and bus 18. Line cards 30 also receive cells for communication to subscribers at bus interface 36, and direct these cells to the appropriate lines 32 using line interface 34.

Network interfaces 16 may include any number of network cards 40 that communicate cells between switch 12 and a data network. In addition, network cards 40 may also include subtend modules that allow interconnection between multiple communication devices 10. Each network card 40 provides communication between network lines 42 and bus 18, and includes a line interface 44 and a bus interface 46. Line card 40 also includes any number and/or arrangement of modems, transceivers, and/or processing for communication devices that communicate information between line interface 44 and bus interface 46. Communication device 10 contemplates any arrangement of network cards 40 to couple communication device 10 to any suitable electrical, optical, wireless, or other network device, media, or components.

In operation, communication device 10 communicates information between any terminal or intermediate component coupled to subscriber interfaces 14 or network interfaces 16. As an example, assume that communication device 10 establishes a communication session between subscriber device 50 coupled to subscriber interface 14 and network device 52 coupled to network interface 16. To communicate information between subscriber device 50 and network device 52, communication device 10 first receives information from subscriber device 50 on a selected line 32 coupled to subscriber interface 34. Line card 30 formats this information into appropriate cells for transmission to bus 18 using bus interface 36. Switch 12 receives cells at enqueuer 24 and stores these cells in memory system 20. Scheduler 22 selectively retrieves cells stored in memory system 20 and communicates the cells to bus interface 46 of line card 40 servicing network device 52. Line card 40 formats the cells into an appropriate format for transmission to network device 52 using line interface 44. Similarly, communications from network device 52 to subscriber device 50 may be performed in a similar manner using switch 12.

As both subscriber interfaces 14 and network interfaces 16 support higher bandwidth communication, the number and frequency of cells stored in memory system 20 increases dramatically. Not only may switch 12 maintain a higher capacity memory system 20, but high bandwidth communications may require faster read/write access to memory system 20 to support many high bandwidth communicate sessions. In a particular embodiment, memory system 20 supports high bandwidth communication using interleaved read/write operations between at least two memories. Memory system 20 writes cells received from enqueuer 24 to a memory different from the memory most recently accessed by scheduler 22. By interleaving read/write operations through intelligent selection of the write memory, memory system 20 may include relatively inexpensive memory components, such as dynamic random access memory (DRAM), while maintaining high bandwidth performance of switch 12.

Figure 2:
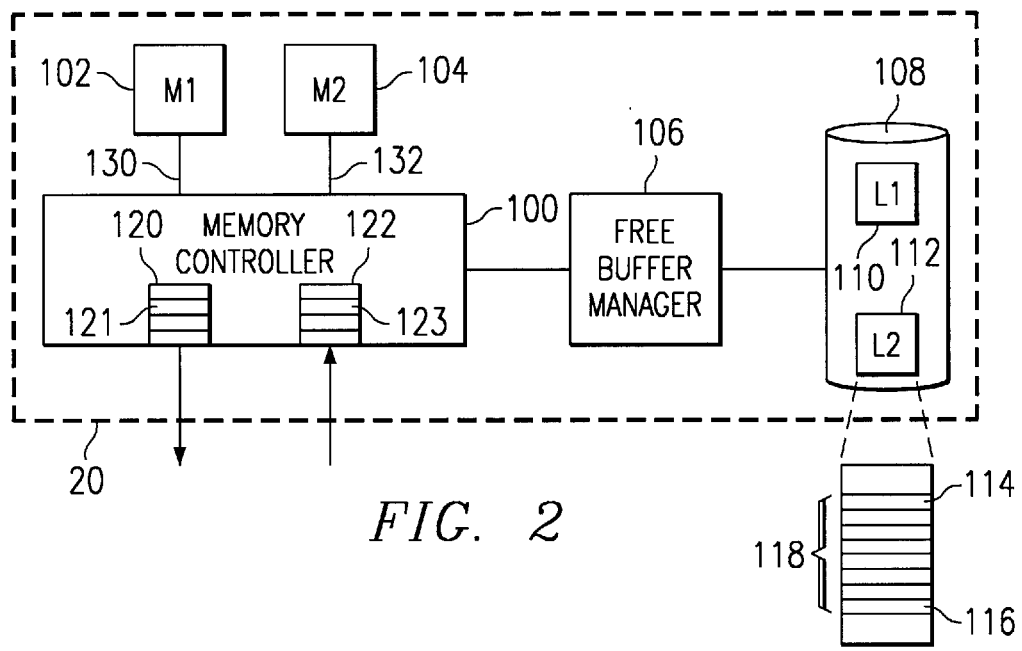
FIG. 2 illustrates in more detail a memory system of the switch in a first configuration.

FIG. 2 illustrates in more detail one embodiment of memory system 20 in switch 12. A memory controller 100 couples to a first memory (M1) 102 and a second memory (M2) 104. Memory controller 100 also couples to a free buffer manager 106 that manages access to memory 108 containing a first cell buffer list (L1) 110 associated with first memory 102 and a second cell buffer list (L2) 112 associated with memory 104. Memory controller maintains a read queue 120 to store read requests 121 from scheduler 22 and a write queue 122 to store write requests 123 from enqueuer 24.

First memory 102 and second memory 104 couple to memory controller 100 using first signal lines 130 and second signals lines 132, respectfully. In this embodiment, memory controller 100 may simultaneously access first memory 102 using signal lines 130 and second memory 104 using signal lines 132. This allows memory controller 100 to execute a partially or fully overlapped read/write operation with memories 102 and 104. In a particular embodiment, memories 102 and 104 are separately accessible blocks of dynamic random access memory (DRAM) that perform a row address selection (RAS) and a column address selection (CAS) to access a particular memory location or buffer for storing cells. This type of memory performs read/write operations using the following sequence: determine a row and column of a buffer to access, pre-charge the memory to enable row selection, perform RAS to select the designated row of the buffer, perform CAS to select the designated column of the buffer, and perform the read/write operation. Memory system 20 directs and/or performs this sequence of steps to read cells from and write cells to memories 102 and 104.

Cell buffer lists 110 and 112 maintain information that specifies available buffers in memories 102 and 104, respectively. Free buffer manager 106 accesses cell buffer lists 110 and 112 to provide memory controller 100 an available buffer in the appropriate memory for performing read/write operations. Cell buffer lists 110 and 112 may be linked lists having a head 114 to specify the beginning of free buffers 118, and a tail 116 that specifies the end of free buffers 118 in the associated memory. In a particular embodiment, free buffer manager 106 updates head 114 of the linked list for each write to associated memory, and tail 116 of the linked list for each read from the associated memory. Memory system 20 contemplates any format of cell buffer lists 110 and 112 that allows free buffer manager 106 to determine available buffers for read/write operations in memories 102 and 104. Although shown as a separate element, free buffer manager 106 may be an integral function of memory controller 100.

Memory system 20 may experience significant performance degradation if each access to memories 102 and 104 requires a pre-charge, RAS, and CAS sequence. If memory system 20 could guarantee that each new access occurs at the same row, then the pre-charge and RAS cycles could be eliminated from the memory access sequence. However, given the number, high bandwidth, and diversity of communication sessions supported by communication device 10, memory system 20 cannot effectively guarantee contiguous access to data on the same row. Without some predictive or ordered read requests, memory 20 may jump between different rows of memories 102 and 104, requiring a pre-charge and RAS sequence for every memory access.

Memory controller 100 eliminates at least the pre-charge cycle time by interleaving read/write requests between memories 102 and 104. This is performed by maintaining separate cell buffer lists 110 and 112 to allow memory controller 100 to separately access memories 102 and 104. By interleaving read/write requests between memories 102 and 104, memory controller 100 may perform a pre-charge after the memory access to enable RAS for subsequent access. By interleaving read/write operations memory controller 100 performs this pre-charge sequence while accessing the other memory, effectively removing the pre-charge cycle costs to memory accesses.

In operation, memory controller 100 receives read requests 121 from scheduler 22 and queues these read requests 121 in read queue 120. Memory controller 100 also receives write request 123 from enqueuer 24 and stores these write request 123 in write queue 122. When ready to act on a write request 123 stored in write queue 122, memory controller 100 queries read queue 120 to designate one of memories 102 and 104 as a read memory that has been accessed during a most recent read operation. Memory controller 100 may query read queue 120, maintain a most recent read flag or indication, or perform any other suitable technique to determine the read memory.

For example, assume memory 102 has been accessed during the most recent read operation and, therefore, memory controller 100 designates memory 102 as the read memory. Memory controller 100 queries free buffer manager 106 for an available buffer to store the cell received in write request 123 in second memory 104. Free buffer manager 106 queries cell buffer list 112 to identify an available buffer in second memory 104. This may be done using, for example, head 114 and/or tail 116 of cell buffer list 112. Before or after the read operation concludes using signal lines 130 of first memory 102, memory controller 100 performs a RAS, CAS and write operation into second memory 104 using signal lines 132. Following this write operation, second memory 104 performs a pre-charge to prepare memory 104 for subsequent access. In this manner, the read from first memory 102 and the write to second memory 104 are interleaved. The pre-charging immediately following the write operation allows a subsequent read operation with second memory 104 to occur without incurring a pre-charge cycle time cost.

Figure 3:
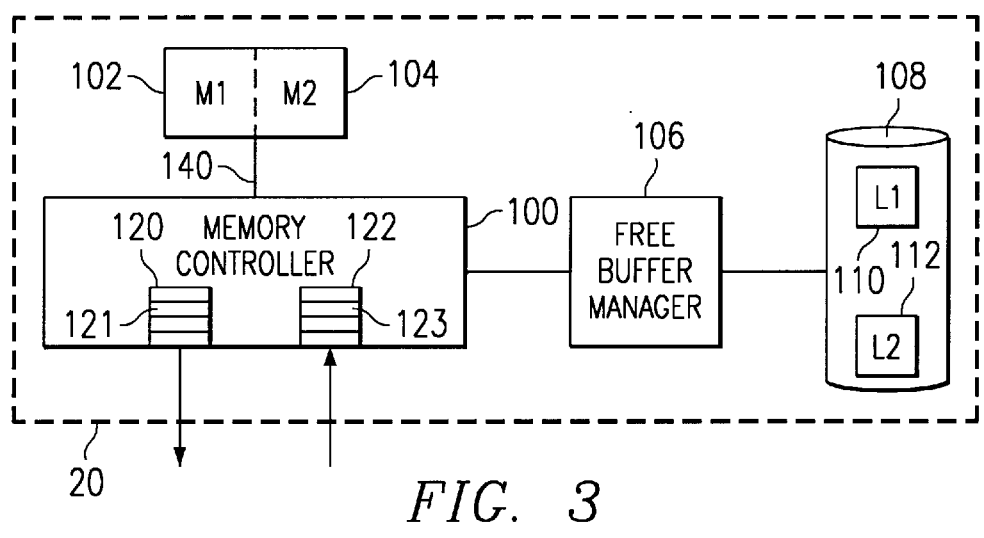
FIG. 3 illustrates in more detail a memory system of the switch in a second configuration.

FIG. 3 illustrates another embodiment of memory system 20 that includes first memory 102 and second memory 104 accessible by memory controller 100 using a common set of signal lines 140. In a particular embodiment, memories 102 and 104 may be banks or other demarcations of a single DRAM integrated circuit having one set of pinouts or signal lines 140. Memory controller 100 operates in a similar manner as described above to interleave read/write operations between memories 102 and 104. Again, assume memory controller 100 designates first memory 102 as the read memory since memory 102 has been accessed during the most recent read operation. To service a write request 123, memory controller 100 queries free buffer manager 106 for an available buffer in second memory 104. As soon as signal lines 140 are available, memory controller 100 performs a RAS, CAS, write, and pre-charge to memory 104 while pre-charge is taking place on memory 102. Again, this interleaved read/write operation allows memory system 20 to improve its overall performance.

Memory system 20 contemplates any number of separate banks, blocks, or other partitions of memory to gain the advantages of interleaved read/write operations. Also, although one particular embodiment for memories suitable for use in memory system 20 are DRAMs, memory system 20 may use any other suitable technologies that can achieve enhanced memory throughput using interleaved read/write operations. Furthermore, although one specific application of memory controller 20 refers to the communication of ATM cells, the interleaved read/write operation can apply as effectively to any other bandwidth intensive communication techniques that temporarily stores relatively small portions of information in the form of cells, packets, frames, or other segments of information.

Figure 4:
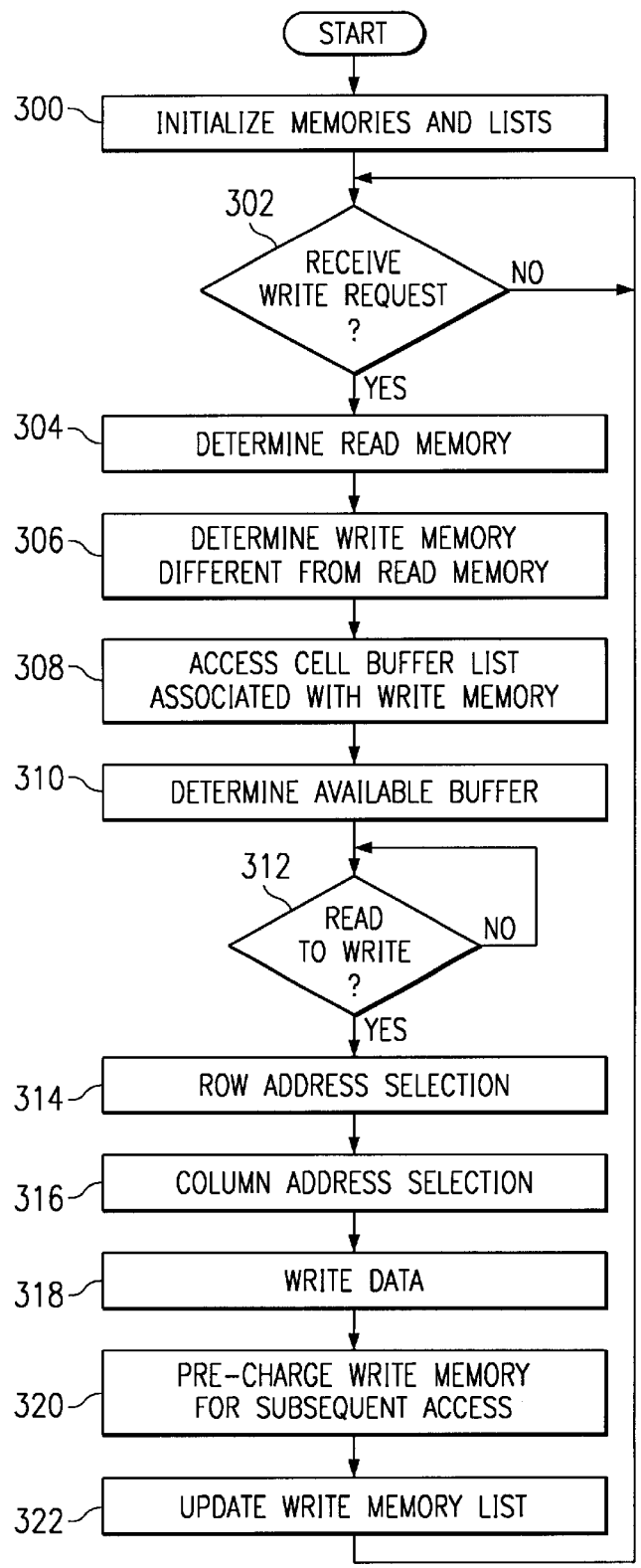
FIG. 4 is a flowchart of the method to perform interleaved read/write operations in the switch.

FIG. 4 is a flowchart of a method performed by memory system 20 to accomplish interleaved read/write operations. The method begins at step 300 where memory system 20 initializes memories 102 and 104 and associated lists 110 and 112. This initialization may include setting heads 114 and tails 116 in lists 110 and 112, pre-charging memories 102 and 104, and other operations to prepare memories 102 and 104 for storage of cells. If memory system 20 receives a write request 123 as determined at step 302, then memory system 20 queries read queue 120 at step 304 to determine a read memory of memories 102 and 104 that has been accessed during the most recent read operation. Memory system 20 then determines a write memory of memories 102 and 104 different from the determined read memory at step 306. Memory system 20 then accesses cell buffer list 110, 112 associated with the write memory at step 308 and determines an available buffer at step 310.

Upon determining the write memory and available buffer, memory system 20 then determines whether the write memory is ready to receive a write at step 312. This decision may depend on whether the specific memory architecture supports separately accessible blocks of memory using separate signal lines (FIG. 2), or other banks of memory accessible using a common set of signal lines (FIG. 3). Once the write memory is ready to access, memory system 20 performs row address selection (RAS) at step 314, column address selection (CAS) at step 316, and writes the data into the available buffer at step 318. Memory system 20 then pre-charges the write memory for subsequent access at step 320. Free buffer manager 106 then updates cell buffer lists 110 and 112 associated with write memory at step 322, and prepares to receive the next write request 123 at step 302.

The flowchart of FIG. 4 illustrates the servicing of write requests 123 to selected memories 102 and 104 based on a most recent read operation. This encourages interleaved read/write operation between memories 102 and 104. This selective writing to memories 102 and 104 based upon recently processed read requests 121 may not guarantee interleaved read/write operation between memories 102 and 104, since memory system 20 may not be able to predict read requests 123 received from scheduler 22. However, by intelligently processing write requests 123 to selected memories 102 and 104, memory system 20 increases the likelihood that interleaved read/write operations will occur in memories 102 and 104. By increasing this likelihood, memory set up operations, such as pre-charging, may occur in one memory while memory system 20 accesses the other memory. This reduces memory access cycle times.

Although the present invention has been described with several embodiments, a myriad of changes, variations, alterations, transformations, and modifications may be suggested to one skilled in the art, and it is intended that the present invention encompass such changes, variations, alterations, transformations, and modifications as fall within the scope of the appended claims.

What is claimed is:

1. An apparatus for cell storage in a data switch, comprising:
    at least two memories operable to store a plurality of cells;
    at least two cell buffer lists specifying locations in the memories available for cell storage, each memory associated with a corresponding cell buffer list;
    a memory controller coupled to the memories and the cell buffer lists, the memory controller operable to receive a write request to store a cell, the memory controller further operable to determine a read memory of the memories that has been accessed during a most recent read operation, the memory controller further operable to determine a write memory different from the read memory and to access a cell buffer list associated with the write memory to determine a buffer to store the cell, the apparatus operable to write the cell to the buffer to interleave read/write operations between the read memory and the write memory.

2. The apparatus of claim 1, wherein the at least two memories comprise at least two banks of a dynamic random access memory (DRAM) accessible using a common set of signal lines.

3. The apparatus of claim 1, wherein the at least two memories comprise at least two separately accessible blocks of dynamic random access memory (DRAM), each block of memory accessible by a separate set of signal lines.

4. The apparatus of claim 1, wherein the cells comprise asynchronous transfer mode (ATM) cells.

5. The apparatus of claim 1, wherein:
    each of the cell buffer lists comprises a linked list having a head that specifies the beginning of a plurality of free buffers in an associated memory and a tail that specifies the end of the free buffers in the associated memory;
    each write to the associated memory causes an update to the head; and
    each read from the associated memory causes an update to the tail.

6. The apparatus of claim 1, wherein the write memory is further operable to:
    perform a row address selection to select a row of the buffer;
    perform a column address selection to select a column of the buffer;
    write the cell into the selected row and column of the write memory; and
    pre-charge the write memory to enable row selection for subsequent access.

7. The apparatus of claim 1, further comprising:
    a scheduler operable to communicate a read request to the memory controller to initiate the most recent read operation; and
    an enqueuer operable to communicate the write request to the memory controller.

8. The apparatus of claim 1, wherein the memory controller determines a read memory by querying a read queue having a plurality of read requests.

9. A communication device; comprising:
    a plurality of subscriber interfaces;
    a plurality of network interfaces; and
    an asynchronous transfer mode (ATM) switch coupled to the subscriber interfaces and the network interfaces, the ATM switch operable to communicate a plurality of ATM cells among the subscriber interfaces and the network interfaces, the ATM switch comprising:
        an enqueuer operable to receive ATM cells from the subscriber interfaces and the network interfaces, and to generate write requests;
        a scheduler operable to generate read requests to communicate ATM cells to the subscriber interfaces and the network interfaces;
        at least two memories operable to store the ATM cells;
        at least two cell buffer lists specifying locations in the memories available to store the ATM cells, each memory associated with a corresponding cell buffer list; and
        a memory controller coupled to the enqueuer, the scheduler, the memories, and the cell buffer lists, the memory controller operable to receive a write request to store an ATM cell from the enqueuer, the memory controller further operable to determine a read memory of the memories that has been accessed during a most recent read operation received from the scheduler, the memory controller further operable to determine a write memory different from the read memory and to access a cell buffer list associated with the write memory to determine a buffer to store the ATM cell, the ATM switch operable to write the ATM cell to the buffer to interleave read/write operations between the read memory and the write memory.

10. The device of claim 9, wherein the at least two memories comprise at least two banks of a dynamic random access memory (DRAM) accessible using a common set of signal lines.

11. The device of claim 9, wherein the at least two memories comprise at least two separately accessible blocks of dynamic random access memory (DRAM), each block of memory accessible by a separate set of signal lines.

12. The device of claim 9, wherein:
    each of the cell buffer lists comprises a linked list having a head that specifies the beginning of a plurality of free buffers in an associated memory and a tail that specifies the end of the free buffers in the associated memory;
    each write to the associated memory causes an update to the head; and
    each read from the associated memory causes an update to the tail.

13. The device of claim 9, wherein the write memory is further operable to:
    perform a row address selection to select a row of the buffer;
    perform a column address selection to select a column of the buffer;
    write the ATM cell into the selected row and column of the write memory; and
    pre-charge the write memory to enable row selection for subsequent access.

14. The device of claim 9, wherein the communication device comprises a digital subscriber line access multiplexer (DSLAM), and wherein:

each subscriber interface comprises at least one twisted pair line interface operable to couple to a subscriber, each subscriber interface operable to communicate ATM cells between the twisted pair line interface and the ATM switch; and each network interface comprises at least one digital interface operable to couple to a packet data network, each network interface operable to communicate ATM cells between the digital interface and the ATM switch.

15. A method to interleave read/write operations in a data switch, the switch having at least two memories operable to store a plurality of cells and at least two cell buffer lists specifying locations in the memories available for cell storage, each memory associated with a corresponding cell buffer list, the method comprising:

receiving a write request to store a cell;

determining a read memory of the memories that has been accessed during a most recent read operation;

determining a write memory different from the read memory;

accessing a cell buffer list associated with the write memory to determine a buffer to store the cell; and writing the cell to the buffer to interleave read/write operations between the read memory and the write memory.

16. The method of claim 15, wherein the at least two memories comprise at least two banks of a dynamic random access memory (DRAM) accessible using a common set of signal lines.

17. The method of claim 15, wherein the at least two memories comprise at least two separately accessible blocks of dynamic random access memory (DRAM), each block of memory accessible by a separate set of signal lines.

18. The method of claim 15, wherein the cells comprise asynchronous transfer mode (ATM) cells.

19. The method of claim 15, wherein:

each of the cell buffer lists comprises a linked list having a head that specifies the beginning of a plurality of free buffers in an associated memory and a tail that specifies the end of the free buffers in the associated memory;

each write to the associated memory causes an update to the head; and each read from the associated memory causes an update to the tail.

20. The method of claim 15, wherein writing the cell to the buffer comprises:

performing a row address selection to select a row of the buffer;

performing a column address selection to select a column of the buffer;

writing the cell into the selected row and column of the write memory; and pre-charging the write memory to enable row selection for subsequent access.

21. The method of claim 15, further comprising:

receiving a read request from a scheduler to initiate the most recent read operation; and receiving a write request from an enqueuer.

22. An apparatus to interleave read/write operations in a data switch, the switch having at least two memories operable to store a plurality of cells and at least two cell buffer lists specifying locations in the memories available for self storage, each memory associated with the corresponding cell buffer list, the apparatus comprising:

means for receiving a write request to store a cell;

means for determining a read memory of the memories that has been accessed during a most recent read operation;

means for determining a write memory different from the read memory;

means for accessing a cell buffer list associated with the write memory to determine a buffer to store the cell; and means for writing the cell to the buffer to interleave read/write operations between the read memory and the write memory.

23. The apparatus of claim 22, wherein the at least two memories comprise at least two banks of a dynamic random access memory (DRAM) accessible using a common set of signal lines.

24. The apparatus of claim 22, wherein the cells comprise asynchronous transfer mode (ATM) cells.

25. Logic encoded in media to interleave read/write operations in a data switch, the switch having at least two memories operable to store a plurality of cells and at least two cell buffer lists specifying locations in the memories available for cell storage, each memory associated with a corresponding cell buffer list, the logic operable to perform the following steps:

receiving a write request to store a cell;

determining a read memory of the memories that has been accessed during a most recent read operation;

determining a write memory different from the read memory;

accessing a cell buffer list associated with the write memory to determine a buffer to store the cell; and writing the cell to the buffer to interleave read/write operations between the read memory and the write memory.

26. The logic of claim 25, wherein the at least two memories comprise at least two banks of a dynamic random access memory (DRAM) accessible using a common set of signal lines.

27. The logic of claim 25, wherein the at least two memories comprise at least two separately accessible blocks of dynamic random access memory (DRAM), each block of memory accessible by a separate set of signal lines.

28. The logic of claim 25, wherein the cells comprise asynchronous transfer mode (ATM) cells.

29. The logic of claim 25, wherein:

each of the cell buffer lists comprises a linked list having a head that specifies the beginning of a plurality of free buffers in an associated memory and a tail that specifies the end of the free buffers in the associated memory;

each write to the associated memory causes an update to the head; and each read from the associated memory causes an update to the tail.

30. The logic of claim 25, wherein writing the cell to the buffer comprises:

performing a row address selection to select a row of the buffer;

performing a column address selection to select a column of the buffer;

writing the cell into the selected row and column of the write memory; and pre-charging the write memory to enable row selection for subsequent access.

31. The logic of claim 25, further comprising:

receiving a read request from a scheduler to initiate the most recent read operation; and receiving a write request from an enqueuer.

* * * * *